(Model.)

2 Sheets—Sheet 1.

S. LIGHTBURNE, Jr.
PIPE COUPLING.

No. 255,523.　　　　　　　　　　Patented Mar. 28, 1882.

Witnesses
Frank A. Brooks
Geo. H. Strong

Inventor
Stafford Lightburne Jr.
By Dewey & Co. Atty's

N. PETERS, Photo-Lithographer, Washington, D. C.

(Model.)
S. LIGHTBURNE, Jr.
PIPE COUPLING.
No. 255,523. Patented Mar. 28, 1882.
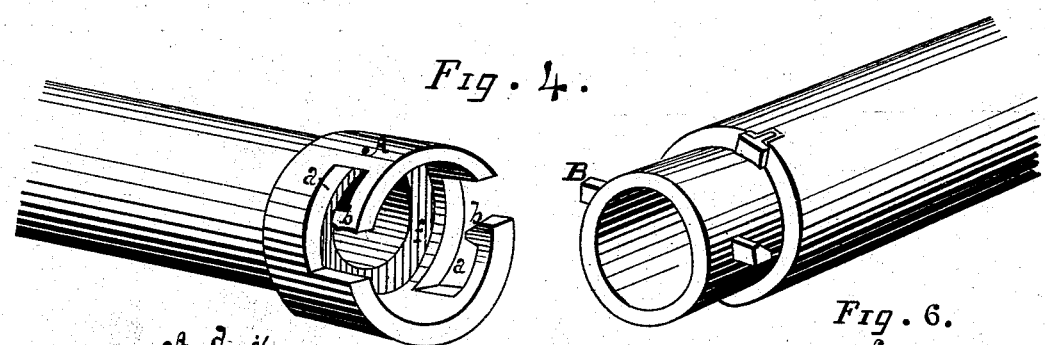
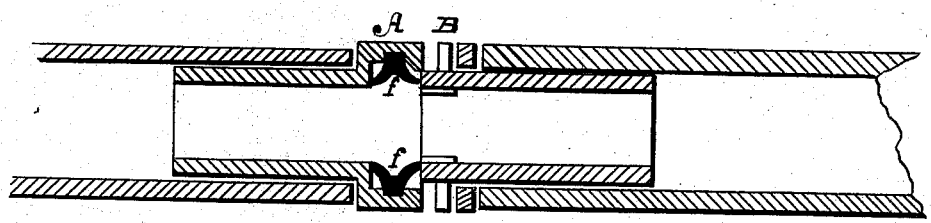
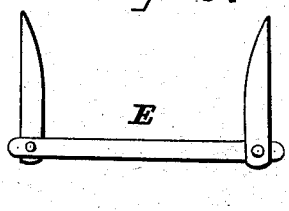
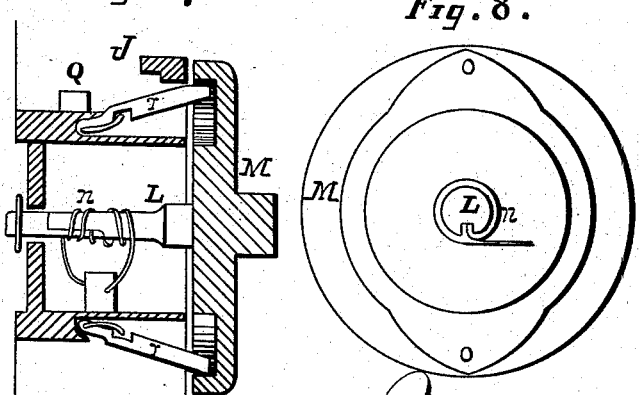
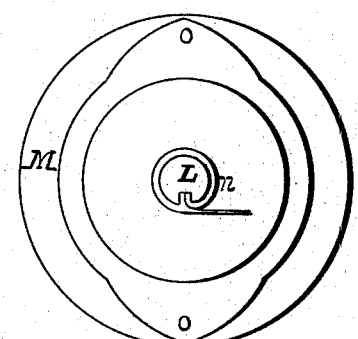

UNITED STATES PATENT OFFICE.

STAFFORD LIGHTBURNE, JR., OF SAN FRANCISCO, CALIFORNIA, ASSIGNOR OF ONE-HALF TO J. R. McKENZIE, OF SAME PLACE.

PIPE-COUPLING.

SPECIFICATION forming part of Letters Patent No. 255,523, dated March 28, 1882.

Application filed June 27, 1881. (Model.)

*To all whom it may concern:*

Be it known that I, STAFFORD LIGHTBURNE, Jr., of the city and county of San Francisco, State of California, have invented an Improvement in Pipe-Couplings; and I hereby declare the following to be a full, clear, and exact description thereof.

My invention relates to certain improvements in pipe-couplings; and it consists in a novel formation of locking lugs and slots on the meeting ends of the coupling, by which the two parts may be firmly united, and in combination with these I employ a peculiarly-constructed elastic ring, by which I am enabled to make a perfectly tight joint.

My present invention is an improvement upon a coupling for which Letters Patent were issued to me and dated April 10, 1877. A cap is employed to protect the end of any coupling when separated, and an implement by which the locking devices may be unclasped or released is also used.

Figure 1:
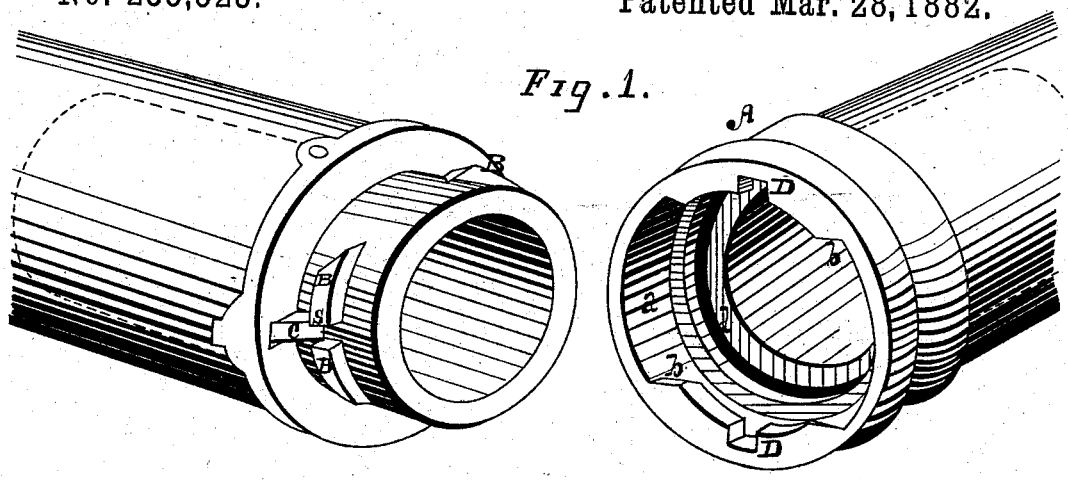
Figure 2:
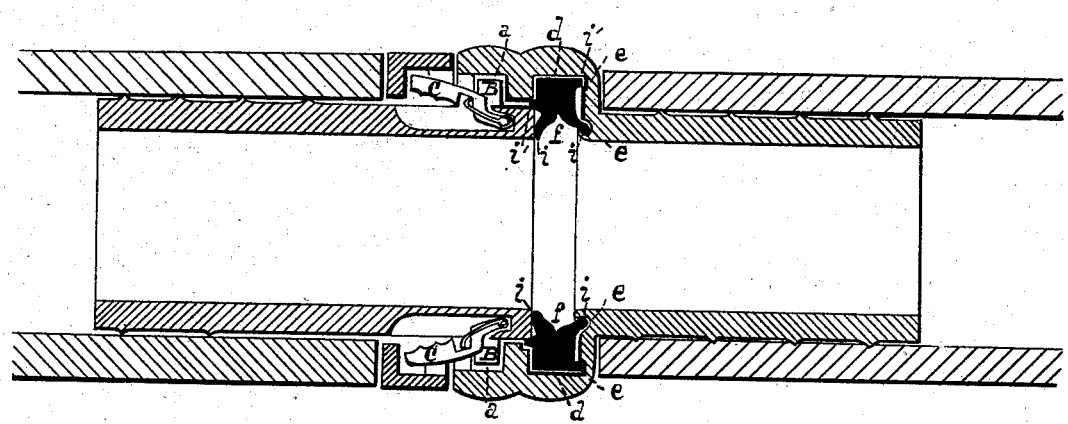
Figure 3:
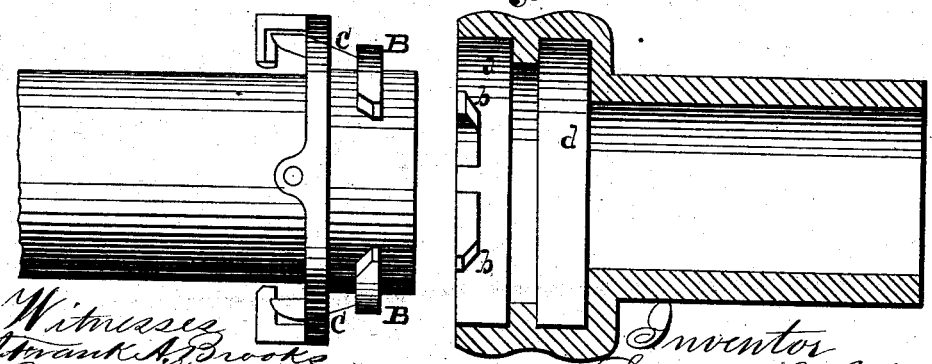

Referring to the accompanying drawings for a more complete explanation of my invention, Figure 1 is a perspective view, showing the two coupling ends. Fig. 2 is a longitudinal section of the coupling ends and the ends of the hose or pipe to be united. Fig. 3 is a longitudinal section, showing the parts separated. Figs. 4 and 5, Sheet 2, show a modification of the coupling ends, in which my elastic ring is employed to make a tight joint and lock. Fig. 6 is a transverse section of the elastic ring. Figs. 7 and 8 show the attachment of a protecting-cap. Fig. 9 is a view of the device for releasing the locking-levers. Fig. 10 is one of the locking-levers with its spring.

A is the metallic end or coupler, which is attached to one end of the hose and forming the female portion, and it is formed with a groove, $a$, around its inner periphery, to receive corresponding lugs, B, from the opposite and entering or male end of the coupling, which is connected with the other part of the hose. This groove runs out upon opposite sides on a bevel, as shown at $b$, so that the lugs B may enter or pass out easily. The lugs B are in the present case made with each end triangular in shape or inclined, so that they may enter the groove or channel $a$ from either direction, instead of entering from one direction only, as in my former patent. These lugs slope backward from the point which is nearest the outer end of the coupling, so that when turned into the channels $a$ these inclines, passing the beveled portions $b$ of the openings, will draw the two parts of the coupling together, and thus compress the packing, so as to make a tight joint, as shown in Fig. 2. The lugs B are made long enough to allow a vertical slot being made across them, as shown at $s$, and the spring levers or latches C, which lock the coupling in place, are protected and strengthened against side strains by being thus supported.

C are spring-levers, which stand at an angle, as shown, and D are notches in the opposite or female part of the coupling, into which these levers fall when the coupling has been turned to a point where the lugs B are beneath the flanges of the opposite portion of the coupling, so as to secure the parts firmly together and prevent them from being unlocked.

Behind the groove $a$, into which the lugs fit, is a second groove or channel, $d$, having depressions at the bottom, as shown at $e\ e'$. This channel receives the elastic packing-ring $f$, which is formed with projecting flanges, as shown at $i\ i\ i'\ i'$, Fig. 6; or it may be described as being grooved on three sides, so as to be more easily compressed to make a tight joint. When the packing-ring is in place and the coupling drawn together by its lugs, as before described, the flanges $i\ i$ will press one against the end of the male coupling and the other in the recess $e$ at the bottom and inner part of the groove $d$; or it may simply press against a plain face at this point, and these form the joint at all times when water is flowing under pressure. If, however, there is a suction, so as to produce a tendency to a vacuum, the flanges or projections $i'\ i'$ will be pressed down against the inner edges of the grooves $e'\ e'$, and will thus make the joint tight against any exterior pressure. The coupling together of the meeting ends of the pipe compresses these projecting flanges and causes them to fit closely against their points of bearing, so as to make a tight joint.

When it is necessary to separate the coupling it is done by means of a device shown at E, Fig. 9. This consists of a bar having two pointed or beveled arms, which may be inserted behind the locking-levers C, and when these arms are pressed forward the beveled sides will draw the levers toward the center until they are sufficiently depressed to allow the couplings to be turned back and released.

In Figs. 4 and 5 open grooves $a$ are shown and the lugs B turned within them, being depressed so as to pass the points $b$, which serve to hold them in place and prevent their uncoupling. The elasticity of the packing $f$ keeps the joint tight at all times and keeps the lugs pressed outward in the grooves $a$, thus locking the coupling together securely.

In order to close the end of the hose when not in use and protect it from the entrance of dirt, &c., I employ a cap, J, which has lugs Q to turn into the groove $a$ in the end of the coupler, and when it reaches a point opposite the notches D a spring-latch, $r$, similar to that shown at C upon the coupling, falls into the notches and holds the cap in place.

A stem, L, passes down through the cap M, to which it is secured, into the interior of the cap J, and springs $n$, surrounding it from opposite directions, are fixed so as to turn the spindle or stem back to its normal position after it has been turned either way by a wrench or key.

When the cap J is introduced to the end of the coupler it is turned until the lugs Q have entered the groove $a$ and hold it in place. The latches $r$ will then stand opposite the spaces $o$ in the outer cap, M, and will thus be allowed to fall into the notches D of the coupling and hold it in place. To remove it the spindle L and cap M are turned around, when the inclined side of the space $o$ will force the latches $r$ inward free of the notches D, after which the cap J may be turned until the lugs are at a point where they may be drawn out of the coupling. As soon as the stem L is left free to turn the springs $n$ force it back to its normal position with relation to the cap J, in which the latches are left free to lock the cap in place whenever it is put on again.

By this construction of my packing I make it so elastic that when the coupling is to be united it gives a sufficient elastic resistance to cause the parts to hold together firmly, and to lock them so that they will not separate, while at the same time it is not necessary to turn them together forcibly by wrenches.

The peculiar formation of the packing and its elasticity will make a tight joint under pressure or suction without any powerful forcing of the couplings together. It is here shown with my coupling as described; but it may also be used with other forms of coupling with equally good results, as its peculiar formation adapts it to any style of coupling.

Having thus described my invention, what I claim as new, and desire to secure by Letters Patent, is—

1. The elastic packing-ring $f$, provided with flanges $i\ i$ and $i'\ i'$, in combination with the coupling A, provided with recesses $e\ e$, substantially as described, and for the purpose set forth.

2. In combination with a coupling having the male portion provided with lugs B and locking latches or levers C, and a female portion having the corresponding groove or channel, $a$, and the notches D, the device E, having the tapering ends for compressing the latches simultaneously and releasing them from the notches, substantially as herein described.

3. The cap J, with the lugs Q, and spring-latches $r$ to fit the groove $a$ and the notches D of the coupling A, in combination with the cap M, fitting over the cap J and having the inclined grooves $o$, into which the ends of the levers $r$ enter, and the stem or spindle L, provided with the springs $n$, by which it and the cap M are held or returned to a position which will allow the latches $r$ to operate, substantially as herein described.

4. The end A of a hose or a pipe coupling having the groove or channel $a$, with projections $b$, beveled at each end, and the notches D, as shown, in combination with the main portion of the coupling, having the lugs B, with the triangular or inclined ends, and the spring locking-levers C, substantially as and for the purpose set forth.

In witness whereof I have hereunto set my hand.

STAFFORD LIGHTBURNE, Jr.

Witnesses:
S. H. NOURSE,
FRANK A. BROOKS.